United States Patent
McKenney

(10) Patent No.: US 9,374,325 B2
(45) Date of Patent: *Jun. 21, 2016

(54) HASH PERTURBATION WITH QUEUE MANAGEMENT IN DATA COMMUNICATION

(71) Applicant: GlobalFoundries Inc., Grand Cayman (KY)

(72) Inventor: Paul Edward McKenney, Beaverton, OR (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 264 days.

This patent is subject to a terminal disclaimer.

(21) Appl. No.: 14/099,310

(22) Filed: Dec. 6, 2013

(65) Prior Publication Data

US 2015/0078398 A1    Mar. 19, 2015

Related U.S. Application Data

(63) Continuation of application No. 14/029,098, filed on Sep. 17, 2013, now Pat. No. 9,178,838.

(51) Int. Cl.
  *G06F 12/08* (2016.01)
  *G06F 3/06* (2006.01)
  *H04L 12/883* (2013.01)
  (Continued)

(52) U.S. Cl.
  CPC .......... *H04L 49/9021* (2013.01); *G06F 3/0611* (2013.01); *G06F 12/0864* (2013.01); *G06F 13/128* (2013.01); *H04L 45/7453* (2013.01); *H04L 49/90* (2013.01); *H04L 49/9068* (2013.01); *G06F 2003/0691* (2013.01)

(58) Field of Classification Search
  CPC . H05L 45/7453; H04L 49/90; H04L 49/9021; G06F 12/0864; G06F 2003/0691; G06F 3/0611; G06F 3/0647; G06F 13/12; G06F 13/122; G06F 13/128
  See application file for complete search history.

(56) References Cited

U.S. PATENT DOCUMENTS

| 7,215,641 B1 | 5/2007 | Bechtolsheim et al. |
| 7,894,343 B2 | 2/2011 | Chao et al. |

(Continued)

OTHER PUBLICATIONS

Eric Dumazet. Codel and fq codel. Linux Plumbers Conference Networking Micro-Conference, Aug. 2012. URL: http://linuxplumbers.ubicast.tv/videos/codel-and-fq_codel-fighting-the-delays/.

(Continued)

*Primary Examiner* — Hal Schnee
(74) *Attorney, Agent, or Firm* — Gibb & Riley, LLC; Michael J. LeStrange, Esq.

(57) ABSTRACT

A method for hash perturbation with queue management in data communication is provided. Using a first set of old queues corresponding to a first hash function, a set of data packets corresponding to a set of session is queued. At a first time, the first hash function is changed to a second hash function. A second set of new queues is created corresponding to the second hash function. A data packet is dequeued from a first old queue in a set of old queues. A second data packet is selected from a second queue in the set of old queues. A new hash value is computed for the second data packet using the second hash function. The second data packet is queued in a first new queue such that the second packet is in position to be delivered first from the first new queue.

13 Claims, 8 Drawing Sheets

(51) Int. Cl.
*G06F 13/12* (2006.01)
*H04L 12/743* (2013.01)
*H04L 12/861* (2013.01)

(56) References Cited

U.S. PATENT DOCUMENTS

| | | | | |
|---|---|---|---|---|
| 2012/0127860 A1* | 5/2012 | Arumilli | ............ | H04L 47/12 370/235 |
| 2012/0188874 A1* | 7/2012 | Kumagai | ............ | H04L 47/2441 370/235 |
| 2012/0314707 A1 | 12/2012 | Epps et al. | | |

OTHER PUBLICATIONS

Van Jacobson. Dynamic congestion avoidance. Message-ID 8802120617.AA20586@lbl-csam.arpa to tcp-ip list, Feb. 1988.

McKenney, Stochastic fairness queuing, in IEEE INFOCOM'90 Proceedings, pp. 733-740, San Francisco, Jun. 1990. The Institute of Electrical and Electronics Engineers, Inc. Revision available: http://www.rdrop.com/users/paulmck/scalability/paper/sfq.2002.06.04.pdf [Viewed May 26, 2008]. URL: http://www.rdrop.com/users/paulmck/scalability/paper/sfq.2002.06.04.pdf, 1-34.

McKenney, Stochastic fairness queuing, Technical Report paulmck.1990.03.25a, Mar. 1990. URL: http://www.rdrop.com/users/paulmck/scalability/paper/sfq.2002.06.04.pdf, 1-34.

Nichols et al; Codel. IETF-84 Transport Area Open Meeting, Jul. 30, 2012. URL: http://www.ietf.org/proceedings/84/slides/slides-84-tsvarea-4.pdf, 1-37.

Nichols et al; Controlling Queue Delay, A modern AQM is just one piece of the solution to bufferbloat., 1-15.

Herbert Xu, bridge: Add core IGMP snooping support, Available: http://kerneltrap.com/mailarchive/linux-netdev/2010/2/26/6270589, Feb. 28, 2010. URL:http://marcinfo/?1=linux-netdev&m=126733574226385&w=2, 1-17.

Notice of Allowance Communication dated Aug. 14, 2015, U.S. Appl. No. 14/029,098, pp. 1-18.

* cited by examiner

HASH PERTURBATION WITH QUEUE MANAGEMENT IN DATA COMMUNICATION

The present application is a continuation application of, and claims priority to, a U.S. patent application of the same title, Ser. No. 14/029,098, which was filed on Sep. 17, 2013, assigned to the same assignee, and incorporated herein by reference in its entirety.

TECHNICAL FIELD

The present invention relates generally to a method for improving data communications. More particularly, the present invention relates to a method for hash perturbation with queue management in data communication.

BACKGROUND

Several data processing systems and applications can simultaneously use a data channel to send and receive data to and from other data processing systems. A variety of devices facilitates such data communication. A router and a switch are some examples of such devices.

A data communication device associates a particular data transfer with a session. A session has several attributes, including a session identifier. Within a data communication device, a session is uniquely associated with an application or an instance thereof that is the recipient of the data.

Different applications exhibit different data communication behaviors. For example, some applications require continuous data transfers, others use data communications sporadically, while some others use data communications in bursts. The manner in which an application performs data communications affects the application's performance. For example, the increasing use of Internet by large numbers of people using web services with frequent small amounts of data, for example, voice over IP (VOIP) or interactive video teleconferencing, has resulted in poor data communication performance in such services. This poor performance manifests itself as undesirably long latencies, dropped packets, and lower than acceptable bandwidth, resulting in poor quality VOIP and video teleconferencing sessions.

Furthermore, when applications of differing data communication behaviors utilize a common channel through a data communication device, they affect each others' performance. For example, a video streaming application, which uses significant and continuous data transfers, can cause sluggish performance in an email application, which shares an internet connection with the streaming application via a common router. A malicious application can also attack a data communication device by flooding the data communication channel at the detriment of other applications that use the data communication channel through the device.

SUMMARY

The illustrative embodiments provide a method for hash perturbation with queue management in data communication. An embodiment queues, using a first set of queues corresponding to a first hash function, a set of data packets corresponding to a set of session in a data processing environment, the first set of queues forming a set of old queues. The embodiment changes, at a first time, the first hash function to a second hash function. The embodiment creates a second set of queues corresponding to the second hash function, the second set of queues forming a set of new queues. The embodiment dequeues, from a first old queue in a set of old queues, a data packet in the set of data packets. The embodiment selects, from a second queue in the set of old queues, a second data packet. The embodiment computes a new hash value for the second data packet using the second hash function. The embodiment queues the second data packet in a first new queue from the set of new queues such that the second packet is in position to be delivered first from the first new queue.

Another embodiment includes computer usable code for queuing, using a first set of queues corresponding to a first hash function, a set of data packets corresponding to a set of session in a data processing environment, the first set of queues forming a set of old queues. The embodiment further includes computer usable code for changing, at a first time, the first hash function to a second hash function. The embodiment further includes computer usable code for creating a second set of queues corresponding to the second hash function, the second set of queues forming a set of new queues. The embodiment further includes computer usable code for dequeuing, from a first old queue in a set of old queues, a data packet in the set of data packets. The embodiment further includes computer usable code for selecting, from a second queue in the set of old queues, a second data packet. The embodiment further includes computer usable code for computing a new hash value for the second data packet using the second hash function. The embodiment further includes computer usable code for queuing the second data packet in a first new queue from the set of new queues such that the second packet is in position to be delivered first from the first new queue.

Another embodiment includes a storage device including a storage medium, wherein the storage device stores computer usable program code. The embodiment further includes a processor, wherein the processor executes the computer usable program code. The embodiment further includes computer usable code for queuing, using a first set of queues corresponding to a first hash function, a set of data packets corresponding to a set of session in a data processing environment, the first set of queues forming a set of old queues. The embodiment further includes computer usable code for changing, at a first time, the first hash function to a second hash function. The embodiment further includes computer usable code for creating a second set of queues corresponding to the second hash function, the second set of queues forming a set of new queues. The embodiment further includes computer usable code for dequeuing, from a first old queue in a set of old queues, a data packet in the set of data packets. The embodiment further includes computer usable code for selecting, from a second queue in the set of old queues, a second data packet. The embodiment further includes computer usable code for computing a new hash value for the second data packet using the second hash function. The embodiment further includes computer usable code for queuing the second data packet in a first new queue from the set of new queues such that the second packet is in position to be delivered first from the first new queue.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
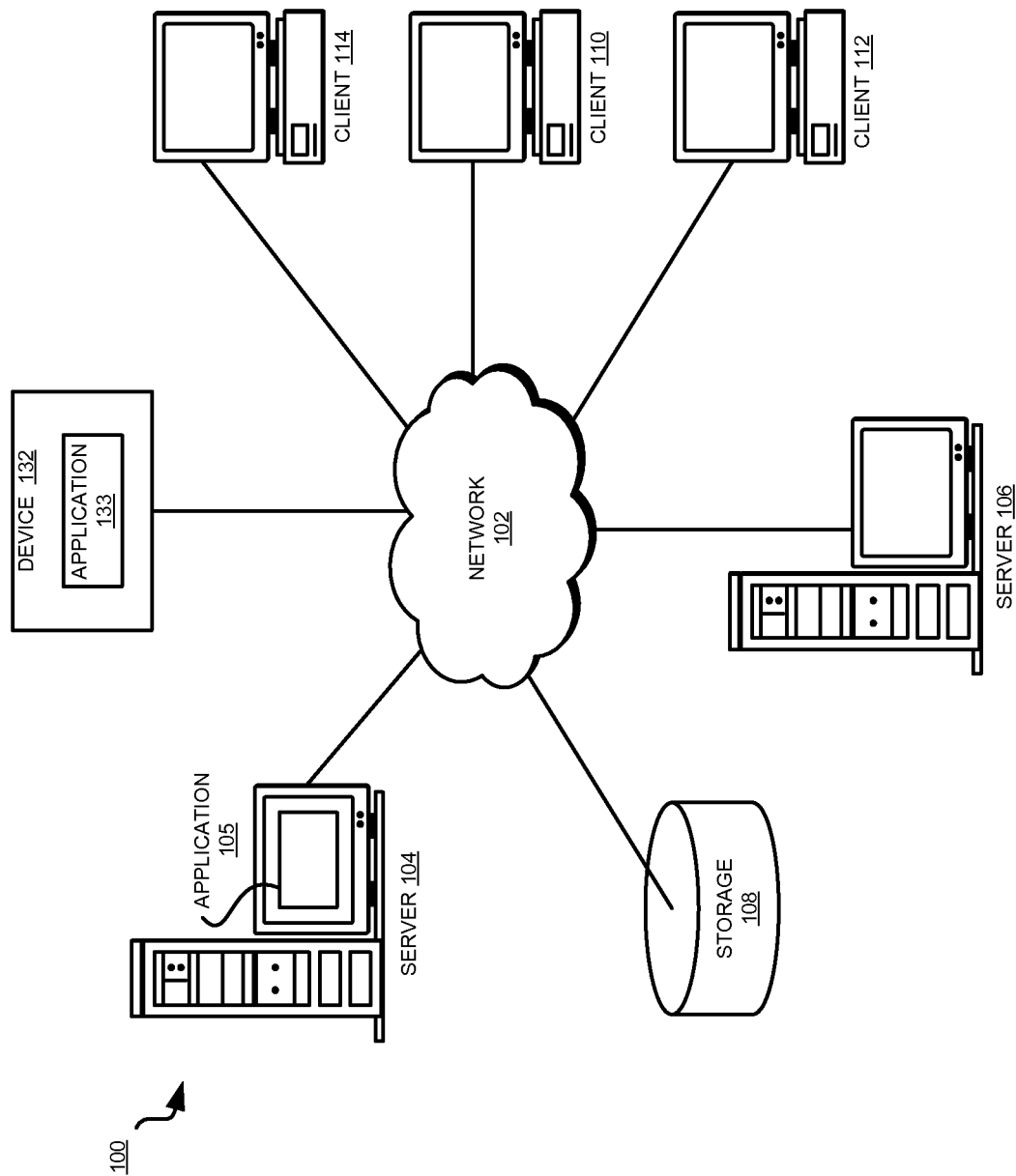
FIG. 1 depicts a block diagram of a network of data processing systems in which illustrative embodiments may be implemented.

An implementation, such as an application or firmware, in a data communication device presently manages the data flow through the data communication device as follows—the implementation receives data packets destined for the different sessions that are being maintained via the device. The implementation selects some attributes of each data packet and generates a hash value by applying the hash function to those attributes. The implementation then queues the data packet in one of several queues according to the hash value, for delivery to their respective sessions. Regardless of whether a session is heavy user or a sporadic user of the data communication channel, the data packets are queued for delivery in this manner.

Some solutions exist for attempting to solve the performance issue associated with applications with different data communication behaviors trying to use a common data communication channel. For example, a controlled delay (CoDel) algorithm is an active queue management algorithm that seeks to limit the delay suffered by data packets for a session.

CoDel operates in devices such as gateways, switches, or routers. CoDel selectively drops packets that have resided in the device for greater than a threshold amount of time. For example, in one implementation, the threshold is defined to be a fraction, typically five percent, of the round-trip time for a data communication in the session. Round trip times are often of the order of one hundred milliseconds for long-haul connections. One approach selectively drops packets from sessions that are attempting to flood the network (referred to as "hog" sessions) so that the delay in servicing other sessions (referred to as "non-hog" sessions) is reduced.

A probabilistic packet dropping approach can also drop packets assuming that a hog session can be expected to have more packets in the queue than any of the non-hog sessions, and a random packet drop is more likely to affect the hog than the non-hogs. In any case, these dropped packets will typically cause the protocol, e.g., slow-start transmission control protocol (TCP) to take congestion-control actions in the session, thereby decreasing the session's offered load, in turn resulting in fair allocation of the data communication channel resource and reducing queuing delays.

If the device in question uses FIFO queuing, a hog session will inflict delays on non-hog sessions. For example, a session performing a large file transfer will unduly delay packets belonging to a VOIP session.

Fairness Queuing CoDel (FQ CoDel) is a presently used method that attempts to solve this problem. FQ CoDel employs a stochastic fairness queuing (SFQ) method that operates by maintaining queues in a manner that a higher than threshold probability exists that the data packets for separate sessions will be queued in separate queues, thereby preventing hog sessions from delaying non-hog sessions.

Because FQ CoDel is a probabilistic method, it is quite possible that packets of an unlucky non-hog session will end up sharing a queue with packets of a hog session. Thus, a probability exists that a non-hog session will, at some point in time, share in the hog session's high latency, in turn resulting in poor performance in the non-hog session, which the presently used FQ CoDel method unsuccessfully sought to avoid.

The illustrative embodiments recognize that one way of preventing such a problem from becoming a long-term problem is to periodically perturb, or change, the hash function. However, the illustrative embodiments also recognize that simply perturbing the hash function causes other problems, such as disruptions in protocol congestion avoidance mechanism. For example, assume that an old hash function has been used to queue some of the packets for a session. Further assume that starting at a cutoff point in time a new hash function is employed for queuing the subsequently arriving packets. The illustrative embodiments recognize a possibility that a packet from before the cutoff time (old packet) that was queued using the old hash function will be farther from the head in an queue according to the old hash value (old queue) and another packet arriving after the cutoff time (new packet) will get queued relatively nearer to the head in a queue according to the new hash value (new queue).

The illustrative embodiments recognize that a possibility exists that the new packet will therefore be delivered to the session before the old packet, causing the packets to be out of sequence. The protocol congestion avoidance mechanism of the session will interpret the out of order packets as a congestion condition that has resulted in missing packets, and cause unnecessary data communication disruption, such as by retrying for one or more older packets.

The out-of-order delivery of packets can be avoided if all the packets in the old queues are delivered (all old queues is drained) before beginning delivery of packets from the new queues. However, the illustrative embodiments recognize that waiting to deliver packets from the new queues until the old queues are completely drained is also an ineffective solution to avoid out of sequence delivery. For example, assume that a packet for a non-hog session is queued with several packets for a hog-session in an old queue. The time delay between the delivery of the non-hog session packet queued in the old queue and another packet for the non-hog session queued in a new queue can become unacceptable if the old queue has a large number of packets for the hog-session and take longer than a threshold amount of time to drain.

As another example, assume that a packet arrives for a non-hog session just after the queue switch is initiated. This new non-hog session packet is therefore placed into a new queue, which will be empty. However, despite having no packets in front of it, this new packet must wait for all the hog packets in the old queues, causing the delay in delivering packets to the non-hog session. A last non-hog session packet arriving on an old queue that is shared with a hog session also sees almost the same penalty.

Even if the packet for the non-hog session was queued in a different queue than the packets of the hog-session, all old queues have to be drained before delivery from the new queues can begin. Therefore, whether the different session packets are queued using the same old queue or different old queues, the delay between packets from old queues and packets from new queues can still exceed a threshold in the non-hog session. In either case, the protocol congestion avoidance mechanism of the non-hog session will interpret the delay as a congestion condition that has resulted in missing packets, and cause unnecessary data communication disruption.

One prior art method simply rehashes all the packets remaining on the old queues immediately at the time of the hash-function switch. One problem with this prior art method is that the method introduces significant latency or delays by having to perform this all-at-once rehashing, and the problem is exacerbated if a large number of packets remain in the old queues at the time of the hash function switch.

Thus, the illustrative embodiments recognize that simply perturbing or changing the hash function can introduce additional delays instead of curing existing delays. Accordingly, the illustrative embodiments recognize that not only are the presently available data packet queuing methods in data communication insufficient for minimizing the cross-session affects on latency, but also that simply changing the hash function is not a sufficient remedy to reduce such latency problems.

The illustrative embodiments used to describe the invention generally address and solve the above-described problems and other problems related to the latency problems in the presently available data packet queuing methods in data communication. The illustrative embodiments provide a method for hash perturbation with queue management in data communication.

An embodiment selects a time window within which a hash function can be changed. Another embodiment selects a threshold time after which the hash function can be changed. Another embodiment selects a time threshold before which the hash function should not be changed, another time threshold after which the hash function must be changed, and duration between the two thresholds where the hash function can be opportunistically changed if certain conditions are met, such as when the old queues are drained below a threshold level.

However and whenever the hash function is changed, another embodiment further manipulates the data packets in the old queues. In one example embodiment, the embodiment dequeues (delivers) a packet from the head of an old queue. The embodiment then rehashes a data packet from the tail of the old queue and moves the rehashed data packet to the head of a new queue selected based on the new hash value.

Additionally, one embodiment sets a time threshold at which the delivery of packets from the old queues is stopped, rehashes and migrates the remaining data packets in old queues to the corresponding new queues, and begins delivery of packets from the new queues. The migration of remaining packets from the old queues to the new queues follows the rehashing and moving from the tail of the old queue to the head of the new queue process described above.

Many variations of this embodiment are possible and are contemplated within the scope of the illustrative embodiments. For example, one variant of the above embodiment keeps track of the longest old queue, and instead of migrating the packet from the tail of the queue from which a packet is dequeued, the variant embodiment migrates a packet from the tail of the longest queue.

One embodiment avoids migration as a quick and dirty way of switching from old hash function and old hash queues to a new hash function and new hash queues. For example, the embodiment drops all remaining packets in the old queue, such as at the elapse of some period, or if an old queue is full. The time period can be measured, for example, from the time the hash function switch was started, the time of the first packet transmission following the time that the hash function switch was started, the time that the first packet was placed into a new queue, or other similar considerations.

Such an embodiment is an extreme measure that disturbs the affected sessions, but the embodiment prefers to disturb the few sessions that share a hog session's queue to delaying all the other sessions that are waiting in the new queues. Another embodiment avoids having to drop existing packets from old queues by dropping packets arriving at a queue that is full beyond a threshold level.

Operating in this example manner, an embodiment reduces the time to drain the old queues before beginning delivery from the new queues, reduces the delay between packets for the same session that are split between in the old queues and the new queues, and preserves the ordering of the packets for each session. Such an operation of an embodiment further improves the probability that even if the packets of a non-hog session were queued with the packets of a hog-session in a common old queue, the shared queuing will last only until the hash is perturbed and data packets are moved to the new queues.

The illustrative embodiments are described with respect to certain data communication devices, data processing systems, environments, components, and applications only as examples. Any specific manifestations of such artifacts are not intended to be limiting to the invention. Any suitable manifestation of the data communication devices, data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
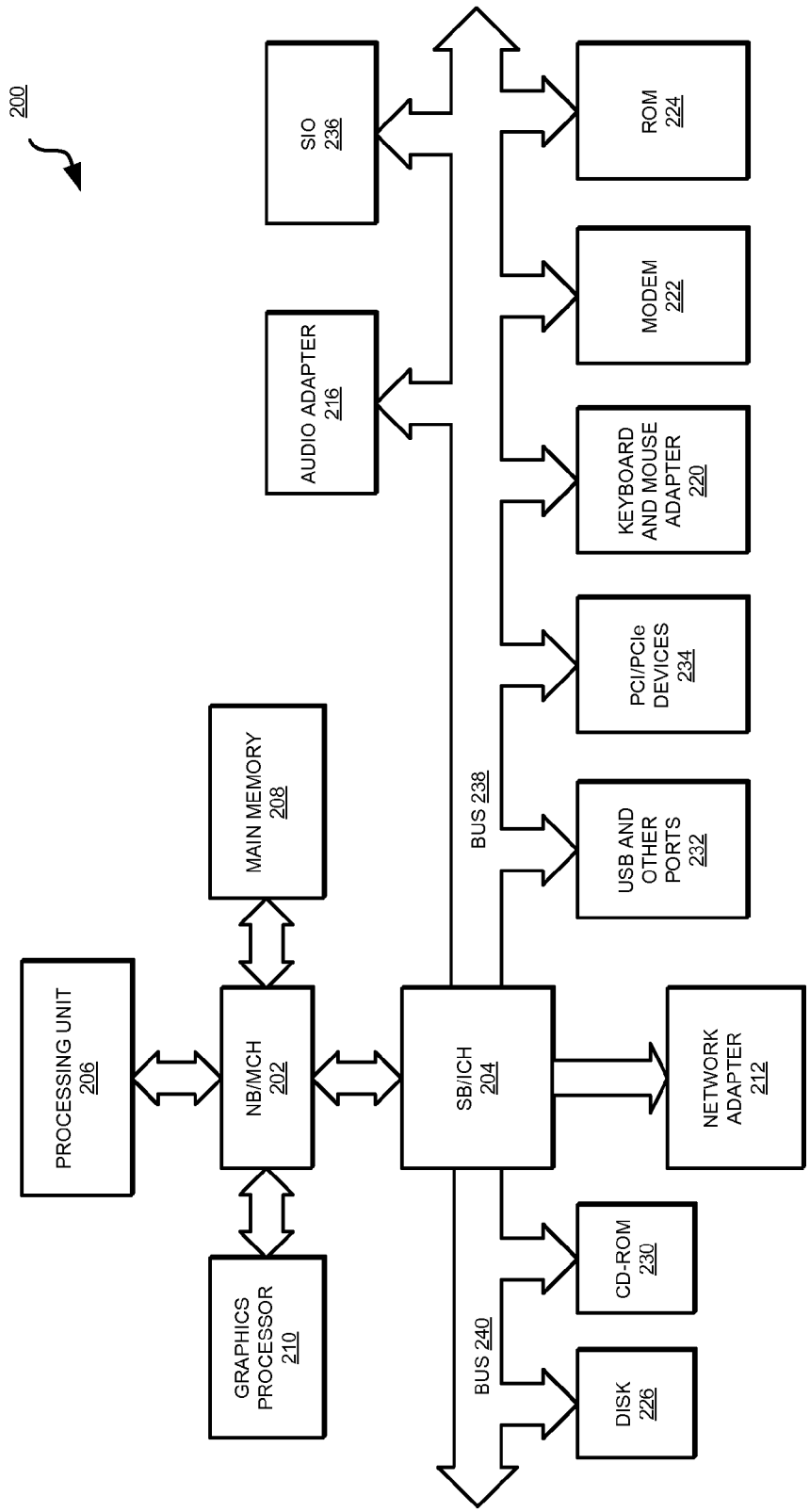
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. In one example configuration, device 132 is a data communication device, such as a switch, that facilitates data communications for applications on servers 104, 106, clients 112, 114, and 116, or a combination thereof. Application 133 implements an embodiment to operate within, or in conjunction with, device 132. Generally, any suitable device, data processing system, or a component thereof, can operate as a facilitator of data communication traffic between two data processing systems, and therefore can also implement or use an embodiment without limitation. For example, in another example configuration, where device 132 is absent from the depicted configuration, a component in data processing system 104 can facilitate data communications. In such a configuration, application 105 implements an embodiment. Generally, any data processing system, such as client 114, can implement an embodiment in a comparable manner within the scope of the illustrative embodiments, Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

Data processing system 200 is also representative of a device, such as device 132 in FIG. 1 in which computer usable program code or instructions implementing the processes of the illustrative embodiments may be located for the illustrative embodiments. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
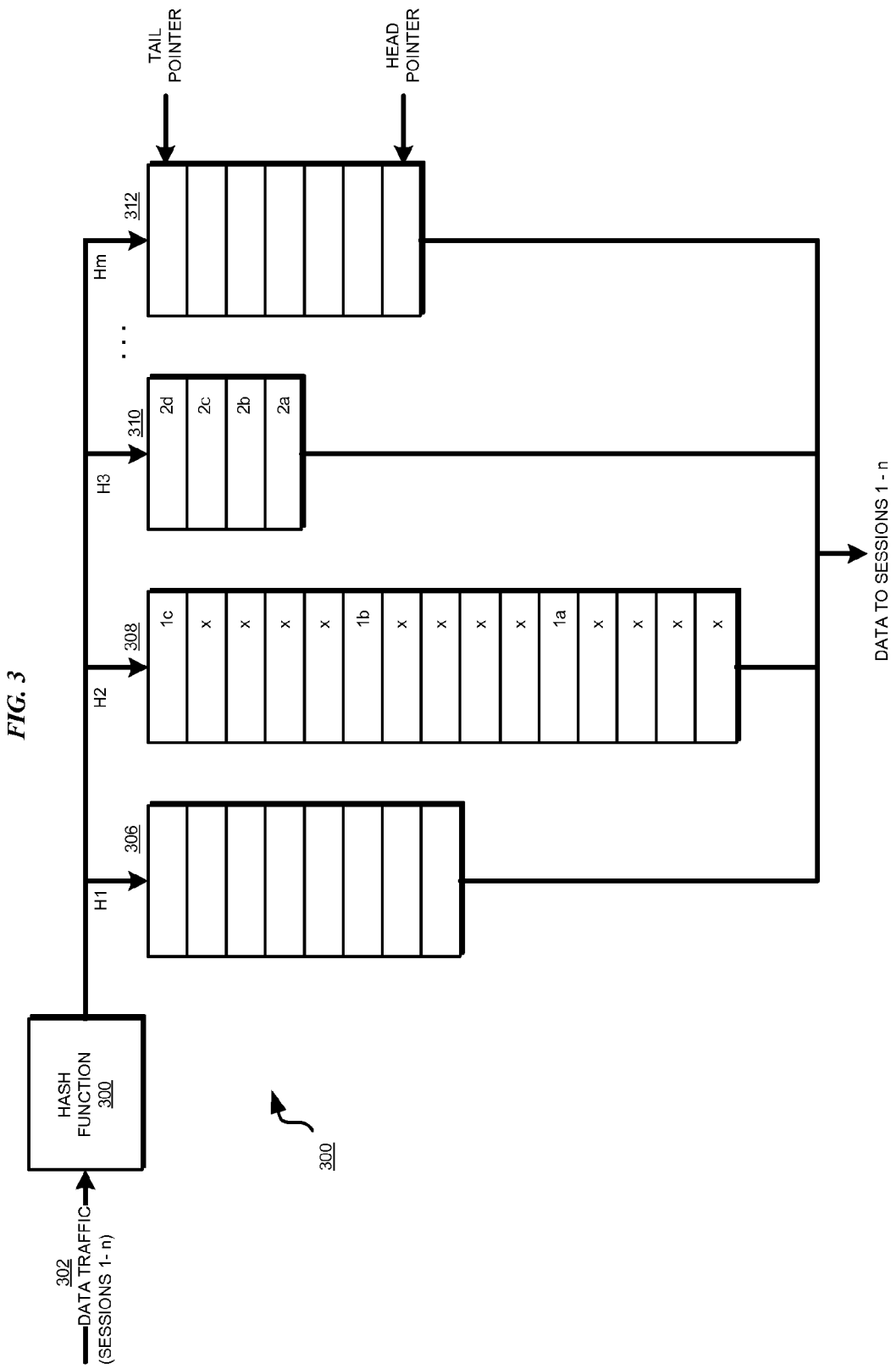
FIG. 3 depicts a block diagram of a packet queuing process that can be improved using an illustrative embodiment.

With reference to FIG. 3, this figure depicts a block diagram of a packet queuing process that can be improved using an illustrative embodiment. As an example, configuration 300 can be implemented in device 132 or data processing system 104 or 114 in FIG. 1. In one embodiment, application 133 or 105, respectively, implements configuration 300 along with a process (not shown) for hash perturbation with queue management in data communication.

Data traffic 302 includes data packets for any number of sessions, such as, for example, sessions 1 through n in a data processing environment, such as data processing environment 100 in FIG. 1. Hash function 304 hashes certain attributes of each data packet in data traffic 302, and generates a hash value corresponding to the data packet.

Configuration 300 maintains a queue for each hash value. For example, suppose that m different hash values are seen at any given time in configuration 300. Accordingly, configuration 300 maintains m different queues. All data packets resulting in hash value H1 are queued in queue 306; all data packets resulting in hash value H2 are queued in queue 308; all data packets resulting in hash value H3 are queued in queue 310; and so on up to hash value Hm and queue 312 where all data packets resulting in hash value Hm are queued in queue 312.

Typically, each queue has a corresponding head pointer that points to the head of the queue, and a tail pointer that points to the tail of the queue. For example, just as queue 312 has head pointer 314 and tail pointer 316, each of queues 306, 308, and 310 also have head and tail pointers (not shown.)

Only as an example way to consistently describe the embodiment, and without implying a limitation thereto, assume that the packets are added to a queue, such as any of queues 306-312 at the tail, and are removed, dequeued, or delivered to a session from the head of the queue. An implementation can similarly add a packet at the head of a queue and deliver a packet from the tail of the queue with similar consequences in any embodiment without departing the scope of the illustrative embodiments.

Ideally, a packet queuing method should separate the packets belonging to different sessions into different queues all the time. However, as the illustrative embodiments recognize, such a solution is not achievable without unacceptable preprocessing cost, and therefore, the presently available methods only provide a probabilistic approach to such separation, achieving such separate queuing only sometimes.

As described earlier, using a presently available method, there exists a possibility where packets of different sessions can become stored in a common queue. For example, packets 1a, 1b, and 1c depicted in queue 308 belong to session 1 and share queue 308 with packets marked "x" that belong to a hog-session x. Packets 2a, 2b, 2c, and 2d belong to session 2 and occupy queue 310.

A packet queuing method services each of the m number of queues, such that none of the queues becomes starved or stagnant. In other words, each queue receives servicing, for example, in a round-robin fashion, so that packets continue to be dequeued from each queue in existence. In depicted configuration 300 and using a presently available packet queuing method, session 1 will experience higher than acceptable latency, because packets 1a, 1b, and 1c, will be delivered as and when the interspaced several packets of session x are delivered, each time queue 308 is serviced.

Figure 4:
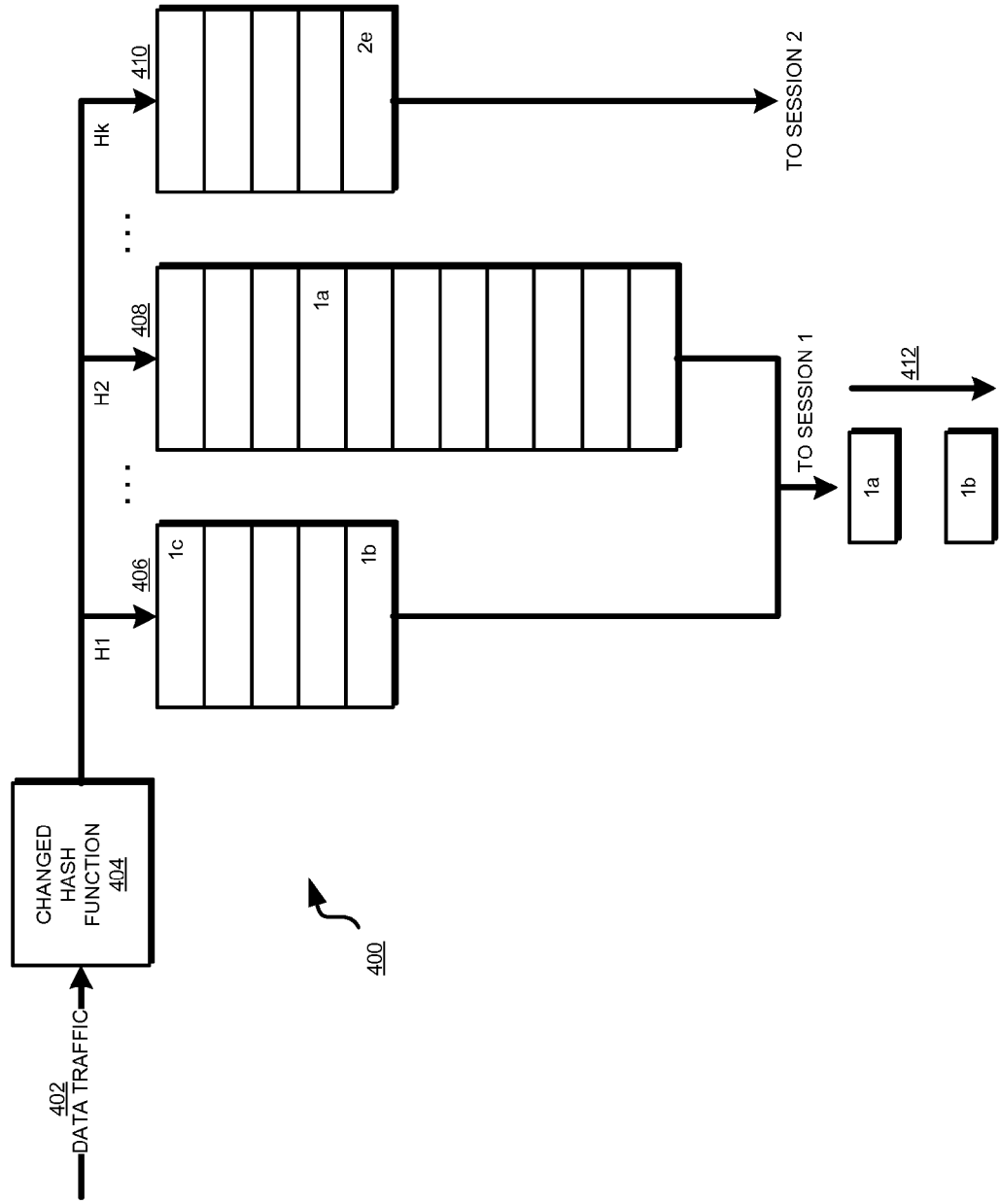
FIG. 4 depicts a block diagram of a packet re-queuing process that can be improved using an illustrative embodiment.

With reference to FIG. 4, this figure depicts a block diagram of a packet re-queuing process that can be improved using an illustrative embodiment. As an example, configuration 400 can be implemented in device 132 or data processing system 104 in FIG. 1. In one embodiment, application 133 or 105, respectively, implements configuration 400 along with a process (not shown) for hash perturbation with queue management in data communication.

Data traffic 402 includes data packets for any number of sessions, such as, for example, sessions 1 through n in a data processing environment, such as data processing environment 100 in FIG. 1. Hash function 404 is a new hash function, as different from hash function 304 in FIG. 3, and is used on data packets received at a packet queuing method instead of hash function 304 after a cutoff time. Hash function 404 hashes certain attributes of each data packet in data traffic 402, and generates a hash value corresponding to the data packet.

Configuration 400 maintains a queue for each hash value. For example, suppose that k different hash values are seen at any given time in configuration 400. Accordingly, configuration 400 maintains k different queues. All data packets resulting in hash value H1 are queued in new queue 406; all data packets resulting in hash value H2 are queued in new queue 408; and so on up to hash value Hk and new queue 410 where all data packets resulting in hash value Hk are queued in new queue 410.

Continuing from the above example of session 1, 2, and x, assume that packet 2e in queue 410 is a new packet arriving for session 2. Assuming new queue 410 is empty or newly created when packet 2e is hashed, packet 2e occupies the first slot in new queue 410. If new queue 410 were sparsely populated at the time of queuing packet 2e, packet 2e would occupy a slot near the head of new queue 410. Session 2 receives packet 2e when packet 2e reaches the head of new queue 410, if not already there, and new queue 410 is dequeued.

Assume that after the hash function was changed to changed hash function 404, some remaining packets were migrated from old queues 306-312 in FIG. 3 to new queues 406-410. Consequently, packets 1a, 1b, and 1c were also migrated, and ended up in different queues. For example, packet 1a is queued in new queue 408 and packets 1b and 1c are queued in new queue 406. Furthermore, it is possible that when packet 1a was queued, new queue 408 was partially occupied, whereas when packet 1b was queued, new queue 406 was empty. Consequently, packet 1b occupies an earlier position in new queue 406 as compared to a position of packet 1a in new queue 408.

When new queues 406 and 408 are serviced, packet 1b is dequeued from new queue 406 earlier than packet 1a is dequeued from new queue 408. Therefore, session 1 receives packet 1b before packet 1a, as shown in ordering 412, causing an out of order condition to be detected in session 1—a cause of an additional problem with presently available methods as described earlier.

An illustrative embodiment remedies the latency problem without causing out of order packets, draining-related delivery delays described earlier or other similar protocol disruption problems. For example, an illustrative embodiment adds a process described herein to application 133 or 105 in FIG. 1 to operate in conjunction with configurations 300 and 400 for hash perturbation with queue management in data communication.

Figure 5:
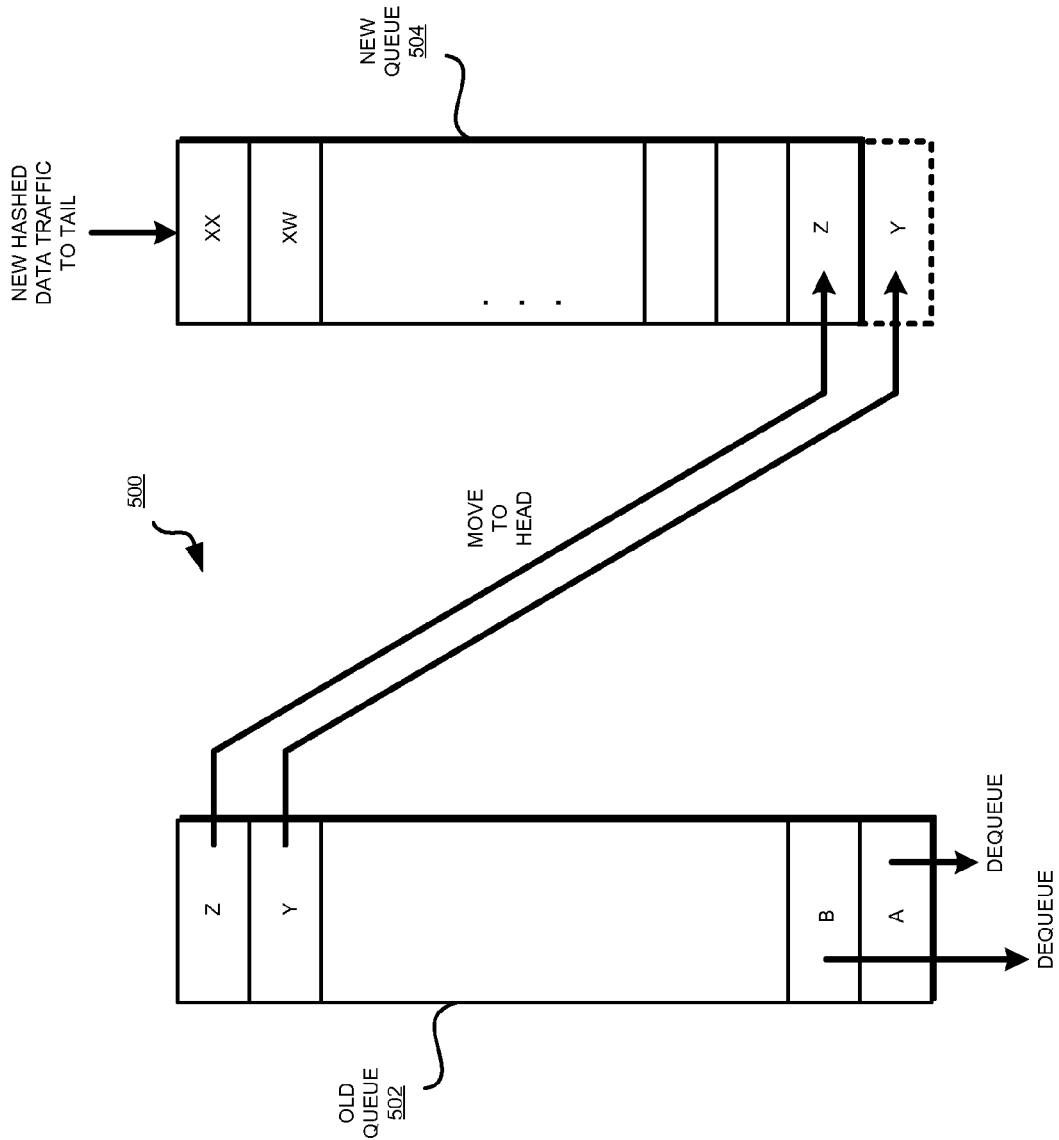
FIG. 5 depicts a configuration for hash perturbation with queue management in data communication in accordance with an illustrative embodiment.

With reference to FIG. 5, this figure depicts a configuration for hash perturbation with queue management in data communication in accordance with an illustrative embodiment. Configuration 500 comprises configuration 300 of FIG. 3 (partially shown for clarity), and configuration 400 of FIG. 4 (partially shown for clarity). Configuration 500 and the process described using configuration 500 can be implemented in application 133 or 105 in FIG. 1.

Assuming only as an example, and without implying any limitation thereto, that an embodiment is implemented in application 133 in FIG. 1, the application performs the described process after the hash function has been perturbed or changed. Upon the change of the hash function both old queues and new queues exist as shown in configuration 500.

Old queue 502 holds data packets that were queued using the old hash function, such as hash function 304 in FIG. 3. Packets A, B, Y, and Z are example packets in old queue 502.

New queue 504 queues those data packets that arrive after the change of hash function. Packet XW and XX are examples of such packets.

In accordance with one embodiment, when a packet is dequeued from the head of old queue 502, the application moves a packet from the tail of old queue 502 to the head of new queue 504. For example, when packet A is dequeued from old queue 502, the application moves packet Z to the head of new queue 504. Subsequently, when packet B is dequeued from old queue 502, the application moves packet Y, which is now the last packet in old queue 502 owing to the moving of packet Z earlier, to the head of new queue 504, to wit, before the previously moved packet Z in new queue 504. An embodiment is not limited to moving only one packet at a time. For example, an embodiment can move multiple packets from the tail of an old queue to the head of one or more new queues in a similar manner without departing the scope of the illustrative embodiments.

The application continues moving the packets from old queue 502 (or another old queue, not shown) to new queue 504 (or another new queue, not shown) in this manner until all the old queues are drained either by dequeuing the packets or moving the packets to the new queues. This process of moving the packets maintains the old packets' relative positioning among themselves and with respect to new packets that arrive after the hash function is changed, avoiding the out of order packet delivery problem in the presently available methods. Furthermore, this process expedites the draining of the old queues, because the old queues are effectively drained or moved from both ends as opposed to only the head as in the presently available methods. The faster draining of the old queues according to this process also reduces the delay in packet delivery as a result of hash perturbation as compared to the delay in the presently available methods.

Figure 6:
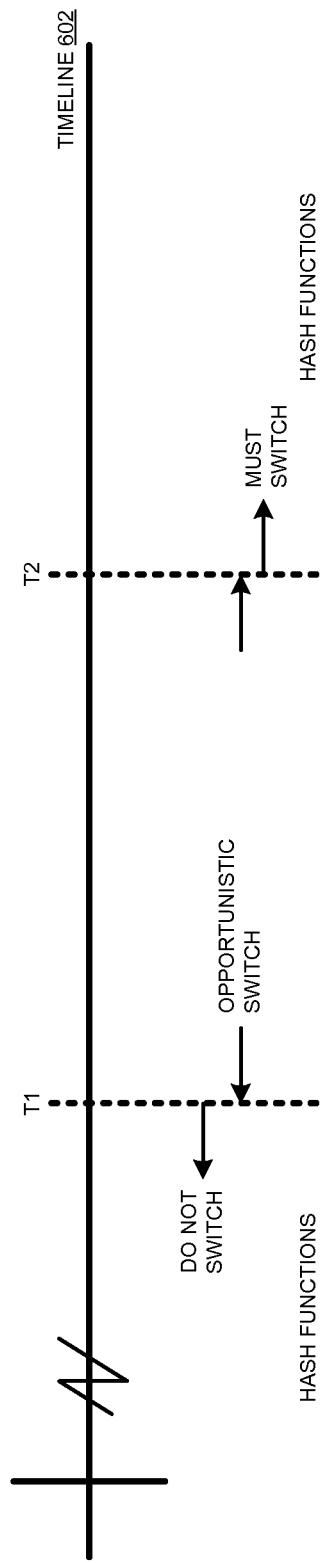
FIG. 6 depicts a timeline for hash perturbation with queue management in data communication in accordance with an illustrative embodiment.

With reference to FIG. 6, this figure depicts a timeline for hash perturbation with queue management in data communication in accordance with an illustrative embodiment. An application, such as application 133 or 105 in FIG. 1 can use timeline 602 for performing the hash perturbation described with respect to FIGS. 4 and 5.

For example, the application sets a time threshold T1 from an initial hash function selection or a previous hash function perturbation. Time threshold T1 can be selected in any suitable manner, such as a fixed period from the initial or previous hash function selection, or a percentage, fraction, or factor of the average roundtrip time of certain packets, or other suitable methods.

In one embodiment, the embodiment does not permit switching hash functions prior to T1 ("Do not switch" side of T1). Switching hash functions, although useful, has computational overhead cost associated there with. Therefore, avoiding switching the hash function too frequently, such as before T1 may be advantageous for striking a balance between the cost of hash function perturbation and the benefit thereof.

In another embodiment, T1 further acts as a decision point where the embodiment determines whether a hash perturbation is needed or will be useful given the current state of queues at time threshold T1. For example, even if hash perturbations are timed a certain period apart, not all perturbations may be useful. For example, at a time when a particular perturbation is permitted, the old queues may be less than a threshold size each and none of the sessions may be reporting unacceptable delays. Thus, the embodiment can safely omit hash perturbation until later.

The application can, under certain circumstances also set a second time threshold T2. For example, while hash perturbations are permissible after T1, they may become mandatory in one embodiment after T2 ("Must switch" side of T2). For example, as a security measure against malicious attacks on the packet queues, a policy may require that the hash function be changed after T2 has elapsed. Thus, effectively, according to an embodiment, hash perturbation becomes permissible after T1 and mandatory after T2.

An embodiment further extends the permissiveness of hash perturbation. For example, while hash perturbation is permitted between T1 and T2 ("Opportunistic switch between T1 and T2), an embodiment uses a greedy or opportunistic algorithm to find a time between T1 and T2 when hash perturbation may cost less than a threshold amount of resources. For example, the embodiment's opportunistic algorithm may attempt to find a time between T1 and T2 when hash perturbation may take less than a threshold amount of time, less than a threshold number of processor cycles, migrate less than a threshold number of packets from old queues to new queues, use less than a threshold amount of memory for the combination of old queues and new queues, or other similarly purposed considerations.

In one embodiment, T1 and T2 are not used at all, or are flexibly defined from one hash perturbation to the next. For example, the embodiment changes a hash function not according to any given timeline, but when the old queues have been drained below a threshold size. In one embodiment, the threshold limit on the drained size is zero, to wit, all old queues has been completely drained and no packets remain in any old queues, when the hash perturbation occurs. In another embodiment the threshold limit on the drained size is a particular size of queues or number of packets, to wit, the old queues has been drained down to the threshold size, or the number of packets remaining in the old queues is less than the particular number of packets.

The above example methods of selecting the timing of hash perturbations are not exhaustive and intended to be limiting on the illustrative embodiments. Those of ordinary skill in the art will be able to conceive other methods for timing or executing hash perturbations to achieve the effects of an embodiment and the same are contemplated within the scope of the illustrative embodiments.

Figure 7:
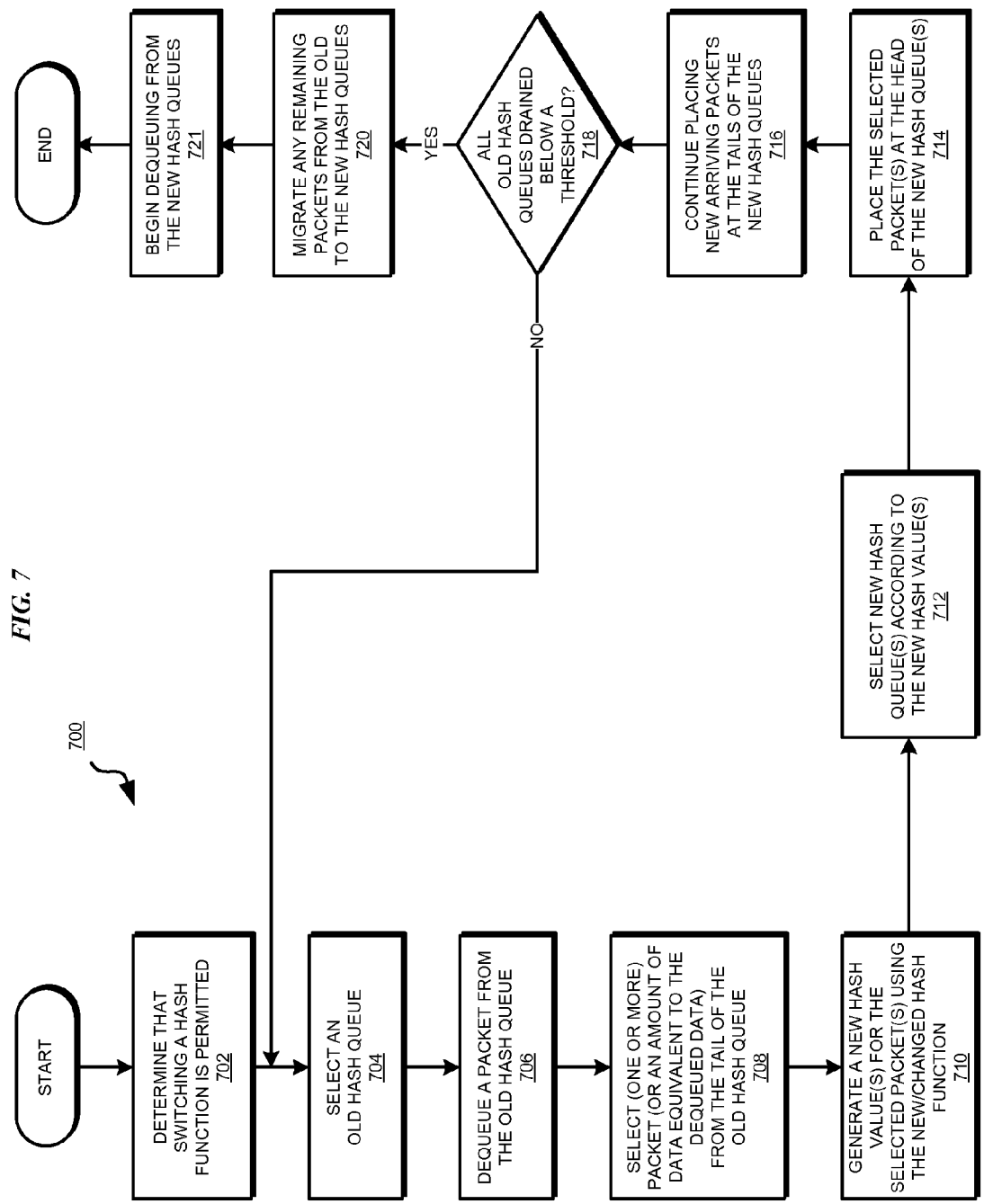
FIG. 7 depicts a flowchart of an example process for hash perturbation with queue management in data communication in accordance with an illustrative embodiment.

With reference to FIG. 7, this figure depicts a flowchart of an example process for hash perturbation with queue management in data communication in accordance with an illustrative embodiment. Process 700 can be implemented in application 133 or 105 in FIG. 1, and can be operated to perform the operation described with respect to FIG. 5.

The application begins process 700 by determining that changing or switching a hash function is permitted (block 702). The application selects an old queue, such as queue 502 in FIG. 5 (block 704). The application dequeues a packet from the old queue (block 706). The application selects a packet from the tail of the selected old queue (block 708).

The application generates a new hash value for the selected packet using the changed hash function (block 710). The application selects a new queue, such as queue 504 in FIG. 5, for the selected packet according to the new hash value (block 712). The application places the selected packet at the head of the new queue (block 714).

The application continues placing new arriving packets according to their hash values at the tail of the new queue and other new queues (block 716). The application determines whether all the old hash queues have been drained below a threshold level (block 718). If one or more old queues have not been drained below the threshold level ("No" path of block 718), the application returns to block 704 in process 700.

If all old queues have been drained below the threshold level ("Yes" path of block 718), the application migrates any remaining data packets from the old queues to the new queues (block 720). The application begins dequeueing from the new queues (block 722). The application ends process 700 thereafter. In one embodiment, the dequeueing of block 722 can begin before all data packets have been moved or migrated from the old queue to the new queues to further reduce the session delays. In another embodiment, the remaining packets in the old queues can be dropped and the migration of block 720 can be omitted in any of the non-exhaustive example manners described with respect to FIG. 3.

Figure 8:
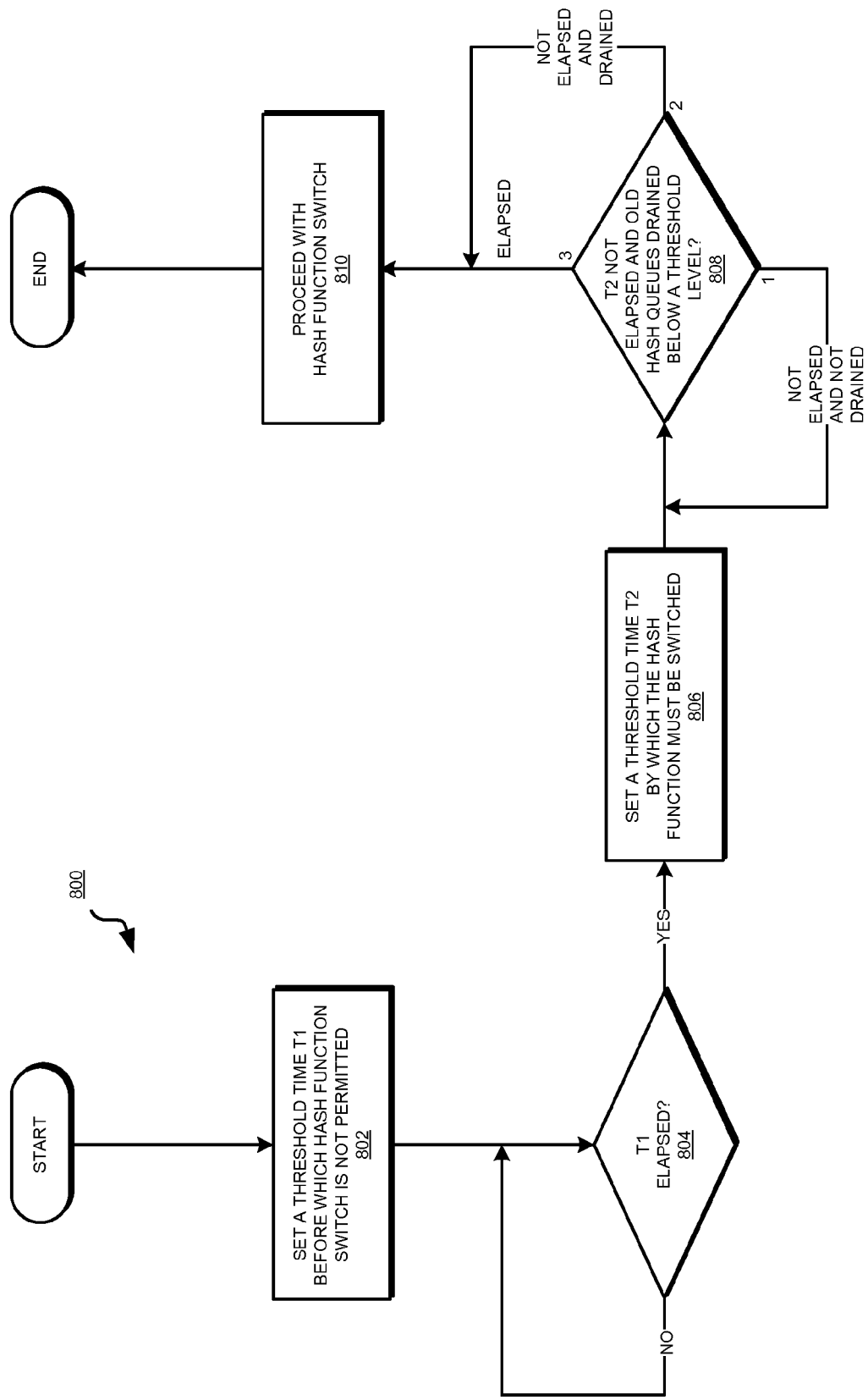
FIG. 8 depicts a flowchart of an example process for determining whether and when to perturb the hash function in accordance with an illustrative embodiment.

With reference to FIG. 8, this figure depicts a flowchart of an example process for determining whether and when to perturb the hash function in accordance with an illustrative embodiment. Process 800 can be implemented in application 133 or 105 in FIG. 1, and can be operated to perform the operation described at block 702 in FIG. 7.

The application begins process 800 by setting a threshold time T1 before which hash function perturbation is not permitted (block 802). The application determines whether T1 has elapsed (block 804). If T1 has not elapsed ("No" path of block 804), the application returns process 800 to block 804, such as after a wait period. If T1 has elapsed ("Yes" path of block 804), the application sets a threshold time T2 by which the hash function must be switched (block 806).

The application determines whether T2 has not yet elapsed and the old queues have drained below a threshold level (block 808). If T2 has not elapsed and the old queues have not drained below the threshold level (path 1 of block 808), the application returns process 800 to block 808, such as after a wait period. If T2 has not yet elapsed and the old queues have drained below the threshold level (path 2 of block 808), the application decides to proceed with the hash function switch (block 810). If T2 has elapsed regardless of whether the old queues have drained or not (path 3 of block 808), the application proceeds to block 810 as well. The application ends process 800 thereafter.

While the various embodiments are described with respect to moving packets, those of ordinary skill in the art will realize that other types of queued data can also be manipulated in the manner of an embodiment to alleviate similar problems with data communications. The movement and migration of non-packeted data is contemplated within the scope of the illustrative embodiments.

Furthermore, the illustrative embodiments recognize that different packets can be of different sizes. An embodiment can be modified to move an equivalent size of data that is dequeued from an old queue, to a new queue. When a dequeued packet is larger than a packet at the tail of a queue, an embodiment can move more than one packet from the tail of the old queue to the new queue within the scope of the illustrative embodiments.

Conversely, when a dequeued packet is smaller than a packet at the tail of the old queue, an embodiment can postpone moving the tail packet to the new queue until more than one packets have been dequeued from the old queue. Other modifications to the embodiment for similar considerations will be apparent from this disclosure to those of ordinary skill in the art and the same are contemplated within the scope of the illustrative embodiments.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for hash perturbation with queue management in data communication. An embodiment solves packet delivery delay problems due to probabilistic circumstances in the presently available packet queuing methods. An embodiment reduces the possibility of non-hog sessions sharing the queues with hog-session packets, timely disrupts any inadvertent chance sharing of queues if they happen, and expedites the packet delivery in an ordered manner after hash perturbation.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for hash perturbation with queue management in data communication, the method comprising:
   queuing, using a first set of queues corresponding to a first hash function, a set of data packets corresponding to a set of sessions in a data processing environment, the first set of queues forming a set of old queues;
   changing, at a first time, the first hash function to a second hash function;
   creating a second set of queues corresponding to the second hash function, the second set of queues forming a set of new queues;
   dequeuing, from a first old queue in the set of old queues, a data packet in the set of data packets;
   selecting, from a second queue in the set of old queues, a second data packet;
   computing a new hash value for the second data packet using the second hash function; and
   queuing the second data packet in a first new queue from the set of new queues such that the second data packet is in position to be delivered first from the first new queue.

2. The method of claim 1, further comprising:
   determining that data packet delivery from the set of old queues has to be stopped and data packet delivery from the set of new queues has to be initiated;
   migrating, responsive to determining that a subset of data packets from the set of data packets remains queued in the set of old queues, the subset of data packets to the set of new queues; and
   beginning at a second time, data packet delivery, including delivering the subset of data packets, from the set of new queues.

3. The method of claim 2, wherein the migrating comprises:
   rehashing a data packet in the subset of data packets using the second hash function to generate a new hash value corresponding to the data packet in the subset of data packets;
   selecting, according to the new hash value corresponding to the data packet in the subset of data packets, a second new queue from the set of new queues for the data packet in the subset of data packets; and
   moving the data packet in the subset of data packets from a second old queue in the set of old queues to the second new queue in the set of new queues, such that the data packet in the subset of data packets occupies a position in the second new queue to be delivered first from the second new queue.

4. The method of claim 2, further comprising:
   determining whether a number of data packets in the set of old queues has reduced below a threshold number, wherein the determining that the data packet delivery from the set of new queues has to be initiated is responsive to the number of data packets in the set of old queues having reduced below the threshold number.

5. The method of claim 1, wherein the second data packet is positioned to be delivered last from the second queue.

6. The method of claim 1, wherein the second queue is the same as the first old queue, and wherein the second data packet is of a size different from a size of the data packet.

7. The method of claim 1, wherein the dequeuing comprises:
   selecting the data packet due to the data packet being in a position to be removed first from the first old queue; and
   delivering the data packet to a session in the set of sessions, the session corresponding to the data packet.

8. The method of claim 1, wherein the changing the first hash function comprises:
   stopping hashing a new data packet arriving after the first time using the first hash function; and
   hashing the new data packet using the second hash function.

9. The method of claim 8, further comprising:
   queuing the new data packet in the first new queue from the set of new queues by positioning the new data packet to be delivered last from the first new queue, wherein the first new queue is selected from the set of new queues according to a hash value of the new data packet according to the second hash function.

10. The method of claim 1, wherein the queuing using the first set of queues corresponding to the first hash function comprises:
    hashing a set of attributes of the data packet in the set of data packets using the first hash function to generate a hash value corresponding to the data packet; identifying the first old queue in the set of old queues that queues data packets having the hash value; and queuing the data packet in the first old queue.

11. The method of claim 1, further comprising: preventing the changing the first hash function to the second hash function prior to the first time, and wherein the changing the first hash function to a second hash function is responsive to a cost of changing to the second hash function being below a threshold cost at the first time.

12. The method of claim 11, wherein the cost is a number of data packets to move from the set of old queues to the set of new queues.

13. The method of claim 1, further comprising:
    determining that data packet delivery from the set of old queues has to be stopped and data packet delivery from the set of new queues has to be initiated;
    dropping, responsive to determining that a subset of data packets from the set of data packets remains queued in the set of old queues, the subset of data packets from the set of old queues; and
    beginning at a second time, data packet delivery, including delivering the subset of data packets, from the set of new queues.

* * * * *